Patented Apr. 6, 1926.

1,579,338

UNITED STATES PATENT OFFICE.

EMIL SUTER, OF BASEL, SWITZERLAND, ASSIGNOR TO THE SOCIETY CHEMICAL WORKS FORMERLY SANDOZ, OF BASEL, SWITZERLAND.

HEART-AFFECTING PURE GLUCOSIDE FROM BULBUS SCILLÆ AND PROCESS FOR PRODUCING THE SAME.

No Drawing. Application filed May 26, 1924. Serial No. 716,050.

*To all whom it may concern:*

Be it known that I, EMIL SUTER, a citizen of the Swiss Republic, and resident of Basel, Switzerland, have invented a new and useful Heart-Affecting Pure Glucoside from Bulbus Scillæ and Process for Producing the Same, of which the following is a full, clear, and exact specification.

In further development of the process described in Letters Patent specification No. 1,516,552 I have discovered a much simpler method for the preparation of pure glucoside from bulbus scillæ, this method being the subject of the present invention.

The extracts of bulbus scillæ advantageously prepared in known manner with neutral organic solvents of low water contents such as alcohol and methanol serving as extracting solvents do not contain the glucoside in the free form but in the form of a compound with natural tannin, from which it is liberated according to the said application before shaking up with a suitable organic solvent not miscible with water, by treatment with a tannin precipitating agent.

Now I have found that the splitting up of the glucoside-tannin complex should at first be refrained from and that on the contrary it is advisable to extract the said complex by means of an organic solvent not miscible with water as for example, methyl- and ethylacetate, methylethyleketone, chloroform and other halogenized hydrocarbon compounds ($CCl_4$, $C_2H_4Cl_2$, $C_2H_5Br$) to which may be added a small quantity of an organic solvent miscible with water such as methanol, alcohol or acetone, the splitting up of the glucoside-tannin compound being subsequently effected on the much purer product of extraction thus obtained. The obtained liquid is carefully evaporated to dryness, the residue dissolved in a mixture of water with a suitable organic solvent (methanol, alcohol, acetone) and the glucoside liberated by addition of a tannin precipitating agent. The excess of tannin precipitating agent is then removed in known manner, the solid residues filtered off from the solution of the purified glucoside which is subsequently concentrated to dryness at low temperature in vacuo. If one of the well known soluble tannin precipitating agents, such as lead subacetate, lead acetate, zinc aceatate, has been employed, then the residue of evaporation will contain besides the pure glucoside also some salts, as for example, sodium acetate and an excess of sodium phosphate, from which the glusoside may be removed by dissolving it out with a suitable organic solvent such as chloroform containing 5% of methanol. This solvent leaves the salt undissolved. Then the solution of the pure glucoside is filtered off and evaporated to dryness.

When using insoluble tannin precipitating agents as for example magnesium oxide, ferric hydroxide, lead oxide, lead hydroxide and aluminum hydroxide this purifying operation becomes superfluous. It is sufficient to evaporate the solution freed from tannin to dryness at low temperature in vacuo, in order to obtain the pure glucoside.

The process for the manufacture of the pure glucoside of squill comprises therefore the removal, from the watery solution of an extract of squills with a neutral solvent, of glucoside in the form of a compound with natural tannin by shaking it with a suitable organic solvent not miscible with water, the concentration of the solution to dryness at low temperature in vacuo and the dissolution of the residue in a mixture of water and a suitable organic solvent, the liberation of the glucoside by addition of a tannin precipitating agent, a subsequent filtration, then removal of the excess of tannin precipitating agent from the filtrate, the separation of the solid residues and the evaporation to dryness of the filtrate at low temperature in vacuo. From the residue which besides pure glucoside contains some salts, the glucoside is recovered by dissolving it out with a suitable organic solvent which leaves the salts undissolved, whereupon the solution is concentrated to dryness at low temperature. With the use of insoluble tannin precipitating agents, the solution freed from tannin and separated from the solid matters is evaporated at low temperature in vacuo and in this way the pure glucoside is directly obtained without further purifying operation.

The pure glucoside of squill thus prepared shows properties corresponding with that prepared according to the specification above referred to. It constitutes a slightly yellowish powder free from ash, unable to reduce even in concentrated solution Fehling's solution, having a high physiological efficacy, giving according to the Frog standard of Houghton-Straub 1200 to 1300 Frog doses per 1 mg. of substance, showing a decrease of efficacy in aqueous solution at higher temperature even after short time, being reduced owing to hydrolization even in the cold by dilute aqueous acids to sugar reducing Fehling's solution and to a fairly crystallized product of dissociation almost insoluble in water.

*Example I.*

100 gms. of the alcoholic extract of pulvis bulbus scillæ concentrated to dryness are dissolved in 300 c. cm. of water. The watery solution is completely exhausted with consecutive portions of each 300 c. cm. of a mixture of chloroform with 10 per cent by volume of methanol, the extraction liquid is dried by means of anhydrous sodium sulphate, filtered and concentrated at low temperature to dryness. The glucoside-tannin compound is left in the form of a light yellow non-hygroscopic sugar- and ash-free powder, which is only soluble with very great difficulty in pure water, but is nevertheless fairly easily soluble in water containing sodium bicarbonate. The residue of evaporation is now dissolved in 3 litres of a water methanol mixture (1:1), 50 c. cm. of lead subacetate are added to the solution, the lead precipitate is filtered off and washed with 1 litre of the watery methanol. The filtrate is then freed from lead with 30 c. cm. of a 28 per cent solution of disodium phosphate. The glucoside solution is filtered off from the deposit, the latter washed with 1 litre of the 50 per cent methanol and the solution concentrated in vacuo at a temperature not exceeding 30° C., during which little by little a portion of the glucoside separates. This is filtered off, the product remaining in the form of a white powder, washed with a little water and the filtrate concentrated to dryness. The remainder of the glucoside is extracted from the residue by dissolving with chloroform containing 5 per cent of methanol, filtering and eliminating the undissolved salts by washing with the same chloroform-methanol mixture. The glucoside is recovered by distilling off the solution thus obtained and is mixed with the previously filtered off fraction.

*Example II.*

700 gm. of a methanol extract of powder squills evaporated to dryness are dissolved in 1 litre of water. The watery solution is exhausted with equal portions each of 1,000 c. cm. of chloroform containing 10 per cent of methanol, the solution dried with anhydrous sodium sulphate, poured off therefrom and the solvent distilled off. The residue is then dissolved in 5 litres of a water-methanol mixture (1:1) and 150 g. lead hydroxide are added to the solution, the solution is repeatedly shaken, filtered and the residue washed with 1 litre of the water-methanol mixture. By concentrating to dryness in vacuo at a temperature not exceeding 30° C. the glucoside of the squills is left free from any detectable foreign admixtures. In order to collect it from the large evaporating vessel, the residue is taken up with a little methanol and the solvent again distilled off.

*Example III.*

The alcoholic extract obtained from 5 kg. pulvis bulbus scillæ and evaporated to dryness is dissolved in 500 c. cm. of water and the watery solution extracted with acetic ester until it is free from the last traces of cardio-active substances. The acetic ester solution is dried with anhydrous sodium sulphate, poured off therefrom and then concentrated to dryness. The residue is then dissolved in 5 litres of 50 per cent alcohol and the solution thoroughly shaken up with 150 gm. of lead hydroxide, filtered after one hour and the residue washed with 1 litre of 50 per cent alcohol. The filtrate is concentrated to dryness in vacuo at a temperature not exceeding 30° C. and the remaining pure glucoside collected as set forth in example 2.

*Example IV.*

The tinctura scillæ according to the Swiss Pharmacopœia IV prepared from 200 g. bulbus scillæ is freed from alcohol by distillation at a low temperature. The watery solution is exhausted with successive portions of 100 c. cm. of ethyl-acetate. The acetic ester solution is dried with anhydrous sodium sulphate; it is then filtered, and the solvent distilled off. The residue is dissolved in 200 c. cm. of 50 per cent alcohol, 10 gm. of lead hydroxide are added to the solution and the solution is thoroughly shaken. The solution is then filtered; the residue washed with 50 c. cm. of 50 per cent alcohol, and the filtrate distilled to dryness at low temperature, the remaining glucoside being freed from foreign admixtures.

What I claim is:

1. A process for the manufacture of heart-affecting pure glucoside from bulbus scillæ, consisting in removing from a watery solution of an extract of squills the glucoside in form of a compound with natural tannin by shaking up with an organic solvent not miscible with water, evaporating the solution in vacuo to dryness at low temperature, dissolving the residue in a mixture of water and an organic solvent, liberating the glucoside by addition of a tannin precipitating agent, filtering, precipitating the excess of tannin precipitating agent in the filtrate, evaporating the solution obtained by filtering off from the solid matter in vacuo to dryness at low temperature, extracting the glucoside from the residue containing the glucoside with salts by means of an organic solvent leaving said salts undissolved and evaporating the thus obtained solution to dryness at low temperature.

2. A process for the manufacture of heart-affecting pure glucoside from bulbus scillæ, consisting in using an extract from bulbus scillæ with an organic solvent of low water content evaporated to dryness, preparing a watery solution therewith, removing from this solution the glucoside in form of a compound with natural tannin by shaking up with an organic solvent not miscible with water, evaporating the solution in vacuo to dryness at low temperature, dissolving the residue in a mixture of water and an organic solvent, liberating the glucoside by addition of a tannin precipitating agent, filtering, precipitating the excess of tannin precipitating agent in the filtrate, evaporating the solution obtained by filtering off from the solid matter in vacuo to dryness at low temperature, extracting the glucoside from the residue containing the glucoside with salts by means of an organic solvent leaving said salts undissolved and evaporating the thus obtained solution to dryness at low temperature.

3. A process for the manufacture of heart-affecting pure glucoside from bulbus scillæ, consisting in removing from a watery solution of an extract of squills the glucoside in form of a compound with natural tannin by shaking up with an organic solvent not miscible with water, evaporating the solution in vacuo to dryness at low temperature, dissolving the residue in a mixture of water and an organic solvent, liberating the glucoside by addition of an insoluble tannin precipitating agent, filtering off from the solid matter and evaporating the filtrate in vacuo to dryness at low temperature to obtain pure glucoside without further purifying operation.

4. A process for the manufacture of heart-affecting pure glucoside from bulbus scillæ, consisting in removing from a watery solution of an extract of squills the glucoside in form of a compound with natural tannin by shaking up with an organic solvent not miscible with water, in addition with a small quantity of an organic solvent miscible with water, evaporating the solution in vacuo to dryness at low temperature, dissolving the residue in a mixture of water and an organic solvent, liberating the glucoside by addition of a tannin precipitating agent, filtering, precipitating the excess of tannin precipitating agent in the filtrate, evaporating the solution obtained by filtering off from the solid matter in vacuo to dryness at low temperature, extracting the glucoside from the residue containing the glucoside with salts by means of an organic solvent leaving said salts undissolved and evaporating the thus obtained solution to dryness at low temperature.

In witness whereof I have hereunto signed my name this 15th day of May, 1924.

EMIL SUTER.